United States Patent
Akiyama et al.

(10) Patent No.: US 8,791,825 B2
(45) Date of Patent: Jul. 29, 2014

(54) BIOLOGICAL STATE DETERMINATION DEVICE

(75) Inventors: Tomonori Akiyama, Susono (JP); Syun Taguchi, Nagoya (JP)

(73) Assignee: Toyota Jidosha Kabushiki Kaishi, Toyota-Shi (JP)

( * ) Notice: Subject to any disclaimer, the term of this patent is extended or adjusted under 35 U.S.C. 154(b) by 155 days.

(21) Appl. No.: 13/634,016

(22) PCT Filed: Mar. 11, 2010

(86) PCT No.: PCT/JP2010/054122
§ 371 (c)(1),
(2), (4) Date: Sep. 11, 2012

(87) PCT Pub. No.: WO2011/111206
PCT Pub. Date: Sep. 15, 2011

(65) Prior Publication Data
US 2013/0002417 A1    Jan. 3, 2013

(51) Int. Cl.
*G08B 23/00* (2006.01)
(52) U.S. Cl.
USPC .......................................... 340/575; 340/439
(58) Field of Classification Search
None
See application file for complete search history.

(56) References Cited

U.S. PATENT DOCUMENTS

| 5,745,031 | A | * | 4/1998 | Yamamoto | 340/439 |
| 5,786,765 | A | * | 7/1998 | Kumakura et al. | 340/576 |
| 6,313,749 | B1 | * | 11/2001 | Horne et al. | 340/575 |
| 2005/0024212 | A1 | * | 2/2005 | Hultzsch | 340/575 |
| 2005/0209512 | A1 | * | 9/2005 | Heruth et al. | 600/301 |

FOREIGN PATENT DOCUMENTS

| JP | 07-096767 A | 4/1995 |
| JP | 07-257220 A | 10/1995 |
| JP | 08-332871 A | 12/1996 |
| JP | 11-339200 A | 12/1999 |
| JP | 2002-183900 A | 6/2002 |
| JP | 2004-341954 A | 12/2004 |
| JP | 2008-165348 A | 7/2008 |

OTHER PUBLICATIONS

International Search Report mailed Jun. 15, 2010 of PCT/JP2010/054122.

* cited by examiner

*Primary Examiner* — Brian Zimmerman
*Assistant Examiner* — Kevin Lau
(74) *Attorney, Agent, or Firm* — Kenyon & Kenyon LLP

(57) ABSTRACT

It is possible to determine the biological state of the driver of a vehicle with high accuracy. In a biological state determination device, since a driver biological state which is the biological state of the driver is estimated on the basis of information representing the biological state of the driver, a weight is set for each driver biological state on the basis of information representing the level of possibility of erroneously estimating the driver biological state, and each driver biological state is weighted on the basis of the set weight, the weighted driver biological state becomes information in which the possibility of erroneous estimation is taken into consideration. The presence/absence of an abnormality in the biological state of the driver is determined on the basis of a plurality of weighted driver biological states, thereby improving determination accuracy of the biological state of the driver of the vehicle.

4 Claims, 5 Drawing Sheets

| WORN ARTICLE CLASS | NONE | MASK | GLASSES | SUNGLASSES |
|---|---|---|---|---|
| WEIGHT | 1 | 0.6 | 0.5 | 0.2 |

3a (b)

| DETECTION TARGET RECOGNITION RATE | EQUAL TO OR GREATER THAN 90% | EQUAL TO OR GRATER THAN 60% AND SMALLER THAN 90% | EQUAL TO OR GRATER THAN 30% AND SMALLER THAN 60% | SMALLER THAN 30% |
|---|---|---|---|---|
| WEIGHT | 1 | 0.7 | 0.4 | 0.2 |

3b (c)

| SLEEPINESS ESTIMATION RATIO | SMALLER THAN 10% | EQUAL TO OR GRATER THAN 10% AND SMALLER THAN 20% | EQUAL TO OR GRATER THAN 20% |
|---|---|---|---|
| WEIGHT | 1 | 0.6 | 0.2 |

3c

BIOLOGICAL STATE DETERMINATION DEVICE

This is a 371 national phase application of PCT/JP2010/054122 filed 11 Mar. 2010, the contents of which are incorporated herein by reference.

TECHNICAL FIELD

The present invention relates to a biological state determination device which is mounted in a vehicle and determines a biological state of a driver.

BACKGROUND ART

A device which detects dozing during driving on the basis of the state of a driver detected by a sensor has been hitherto known. For example, Japanese Unexamined Patent Application Publication No. 11-339200 describes a device which detects dozing during driving on the basis of information relating to the frequency and speed of blinking, the degree of opening of the eyes, and the like.

CITATION LIST

Patent Literature

[Patent Literature 1] Japanese Unexamined Patent Application Publication No. 11-339200

SUMMARY OF INVENTION

Technical Problem

However, in the above-described device of the related art, a determination value set in advance for each of a plurality of events relating to the driver is added or subtracted to calculate a value representing the level of lowering of consciousness, and determines the lowering of consciousness of the driver on the basis of the calculated value. Hence, there is room for improvement so as to appropriately determine the events relating to the driver and to detect the biological state of the driver with higher accuracy.

Accordingly, the invention has been accomplished so as to solve the above-described problem, and an object of the invention is to provide a biological state determination device capable of determining the biological state of the driver of a vehicle with high accuracy.

Solution to Problem

The invention provides a biological state determination device which is mounted in a vehicle and determines a biological state of a driver. The biological state determination device includes a plurality of state estimation means for estimating a driver biological state, which is the biological state of the driver, on the basis of information representing the biological state of the driver, weight setting means for setting a weight for each driver biological state on the basis of information representing the level of possibility of erroneously estimating the driver biological state, weighting means for weighting a plurality of driver biological states using the weight set by the weight setting means, and state determination means for determining the presence/absence of abnormality in the biological state of the driver on the basis of a plurality of driver biological states weighted by the weighting means.

According to the invention, since the weight is set for each driver biological state on the basis of the information representing the level of possibility of erroneously estimating the driver biological state, and each driver biological state is weighted using the set weight, the weighted driver biological state becomes information in which the possibility of erroneous estimation has been taken into consideration. Since the presence/absence of an abnormality in the biological states of the driver is determined on the basis of a plurality of weighted driver biological states, it is possible to improve the determination accuracy of the biological state of the driver of the vehicle.

It is preferable that the biological state determination device of the invention further includes warning means for giving a warning to the driver through at least one of auditory sensation and visual sensation when the state determination means determines that there is an abnormality in the biological state of the driver.

According to the invention, when there is an abnormality in the biological state of the driver, the driver is warned the determination result indicating that an abnormal state exists through visual sensation or auditory sensation. Therefore, it becomes possible to notify an abnormality to the driver of the vehicle.

In the biological state determination device of the invention, it is preferable that the state estimation means estimates the presence/absence of sleepiness in the driver as the biological state of the driver, and the state determination means determines, as an abnormality, a state where the driver feels sleepiness. According to the invention, since the presence/absence of sleepiness is determined as the biological state of the driver, determination useful for the driver is executed.

In the biological state determination device of the invention, it is preferable that, until a predetermined time set in advance elapses from the start of driving, the weight setting means sets the weight on the basis of the ratio of the time when the state estimation means estimates that the driver feels sleepiness with respect to the predetermined time.

Until the predetermined time elapses from the start of driving, it can be regarded as the time when the driver is less likely to feel sleepiness. Accordingly, when it is estimated that the driver feels sleepiness during this time, there is a high possibility that the estimation is erroneous estimation. According to the invention, since the weight is set on the basis of the ratio of the time when it is estimated that the driver feels sleepiness with respect to the predetermined time, it is possible to improve the determination accuracy of the biological state of the driver.

In the biological state determination device of the invention, it is preferable that the weight setting means sets the weight on the basis of the ratio of a non-detection time of information representing the biological state of the driver in the state estimation means with respect to a given time set in advance.

For the non-detection time of information representing the biological state of the driver, it is not possible to estimate the biological state of the driver. According to the invention, since the weight is set on the basis of the ratio of the non-detection time of information representing the biological state of the driver with respect to the given time set in advance, it is possible to improve the determination accuracy of the biological state of the driver.

In the biological state determination device of the invention, it is preferable that the state estimation means estimates the driver biological state on the basis of the state of the eyes or eyelids of the driver, and the weight setting means sets the weight on the basis of the presence/absence and the type of an article worn on the face of the driver.

When an article is worn on the face of the driver, the estimation accuracy of the driver biological state based on the state of the eyes or eyelids is lowered. According to the invention, since the weight is set on the basis of the presence/absence and the type of an article worn on the face of the driver, it is possible to improve the determination accuracy of the biological state of the driver.

Advantageous Effects of Invention

According to the invention, it is possible to determine the biological state of the driver of the vehicle with high accuracy.

BRIEF DESCRIPTION OF DRAWINGS

FIG. 2 is a diagram showing a weight map in a weight setting unit.

DESCRIPTION OF EMBODIMENTS

Figure 1:
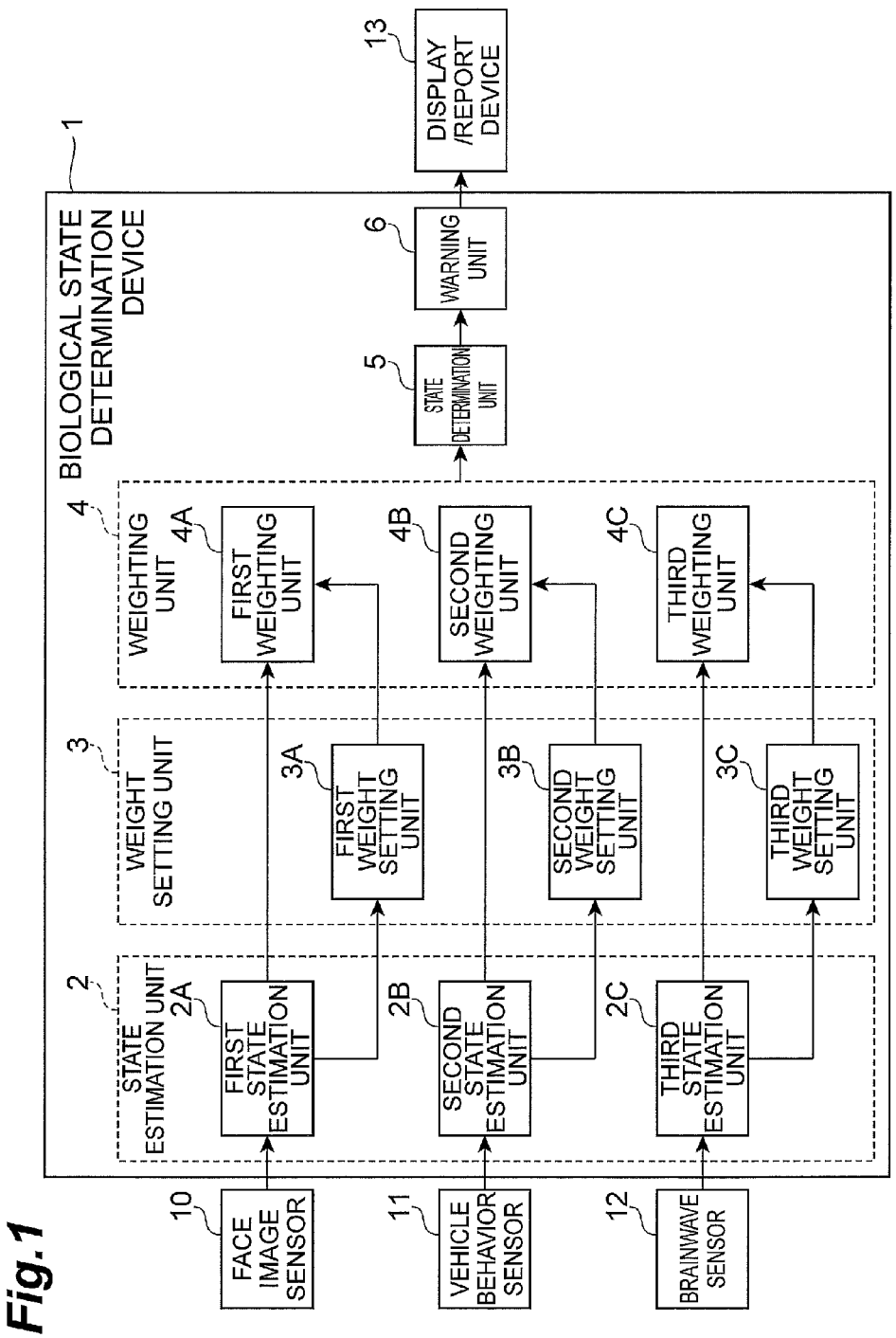
FIG. 1 is a schematic configuration diagram of a biological state determination device according to an embodiment of the invention.

Hereinafter, an embodiment of the invention will be described with reference to the accompanying drawings. In the description of the drawings, the same components are represented by the same reference numerals, and overlapping description will not be repeated.

FIG. 1 is a schematic configuration diagram of a biological state determination device according to this embodiment. A biological state determination device 1 according to this embodiment is a device which is mounted in a vehicle and determines the biological state of the driver.

As shown in FIG. 1, the biological state determination device 1 is connected to a face image sensor 10, a vehicle behavior sensor 11, a brainwave sensor 12, and a display/report device 13.

The face image sensor 10 is a device which detects a face image of the driver of the vehicle. The face image sensor 10 sends the detected face image to the biological state determination device 1.

The vehicle behavior sensor 11 is a device which detects the behavior of the vehicle. In this embodiment, the vehicle behavior sensor 11 detects a relative position of the white lines on a road, on which the host vehicle travels, with respect to the host vehicle, and sends information relating to the detected white line position to the biological state determination device 1.

The brainwave sensor 12 is a device which detects the brainwave of the driver of the vehicle. The brainwave sensor 12 sends information relating to the detected brainwave to the biological state determination device 1.

The display/report device 13 is a device which gives a warning to the driver through visual sensation, auditory sensation, or both of visual sensation and auditory sensation on the basis of warning information acquired from the biological state determination device 1. In this embodiment, the display/report device 13 acquires warning information indicating that the driver feels sleepiness using the biological state determination device 1, and gives a warning to the driver. The display/report device 13 has, for example, devices, such as a display, a lamp, a speaker, and a buzzer.

The biological state determination device 1 includes a state estimation unit 2, a weight setting unit 3, a weighting unit 4, a state determination unit 5, and a warning unit 6.

The state estimation unit 2 estimates a driver biological state, which is the biological state of the driver, on the basis of information representing the biological state of the driver, and includes a first state estimation unit 2A, a second state estimation unit 2B, and a third state estimation unit 2C. In this embodiment, the state estimation unit 2 estimates the presence/absence of sleepiness in the driver as the biological state of the driver. The information representing the biological state of the driver is, for example, the face image of the driver acquired from the face image sensor 10, information relating to the white line position acquired from the vehicle behavior sensor 11, and information relating to the brainwave of the driver. The specific processing details in the first to third state estimation units 2A, 2B, and 2C will be described below in detail. Although in this embodiment, the biological state determination device 1 includes the first to third state estimation units 2A, 2B, and 2C, the number of state estimation units is not limited, and four or more state determination units may be provided.

The weight setting unit 3 sets a weight for each driver biological state on the basis of the level of possibility that the state estimation unit 2 erroneously estimates the driver biological state, and includes a first weight setting unit 3A, a second weight setting unit 3B, and a third weight setting unit 3C. The specific processing details in the first to third weight setting units 3A, 3B, and 3C will be described below in detail. Although in this embodiment, the biological state determination device 1 includes the first to third weight setting units 3A, 3B, and 3C, the number of weight setting units is not limited, and four or more weight setting units may be provided.

The weighting unit 4 weights a plurality of driver biological states with the weight set by the weight setting unit 3, and includes a first weighting unit 4A, a second weighting unit 4B, and a third weighting unit 4C. The specific processing details in the first to third weighting units 4A, 4B, and 4C will be described below in detail. Although in this embodiment, the biological state determination device 1 includes the first to third weighting units 4A, 4B, and 4C, the number of weighting units is not limited, and four or more weighting units may be provided.

The state determination unit 5 determines the presence/absence of an abnormality in the biological state of the driver on the basis of a plurality of driver biological states weighted by the weighting unit 4. In this embodiment, an abnormal state in the biological state of the driver refers to a state where the driver feels sleepiness. That is, the state determination unit 5 determines whether or not the driver feels sleepiness.

In this embodiment, since the weighted driver biological states are numerical information sent from a plurality of weighting units 4, for example, the state determination unit 5 adds or multiplies the driver biological states acquired from a plurality of weighting units 4 to calculate a determination value. When the calculated determination value is greater than a threshold value set in advance, the state determination unit 5 can determine that there is an abnormality in the biological state of the driver. The state determination unit 5 sends the determination result of the presence/absence of an abnormality in the biological state of the driver to the warning unit 6.

When the state determination unit 5 determines that there is an abnormality in the biological state of the driver, the warning unit 6 gives a warning to the driver through at least one of auditory sensation and visual sensation. Specifically, when it is determined that there is an abnormality in the biological state of the driver, the warning unit 6 causes the display/report device 13 to give a warning to the driver.

Figure 3:
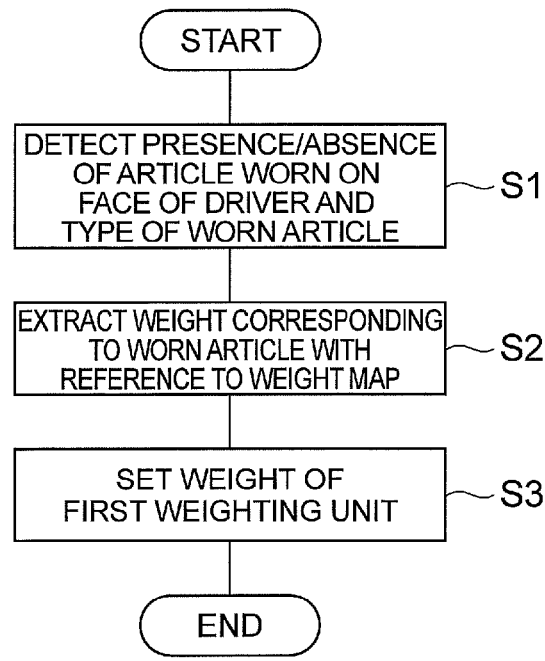
FIG. 3 is a flowchart showing the operation of a first weight setting unit.
Figure 4:
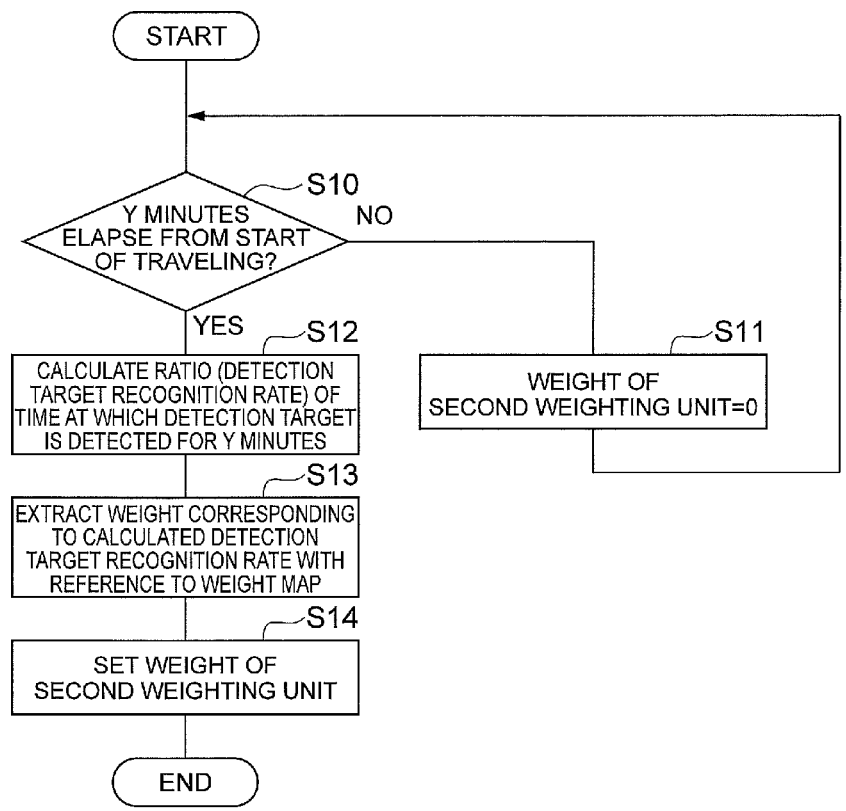
FIG. 4 is a flowchart showing the operation of a second weight setting unit.
Figure 5:
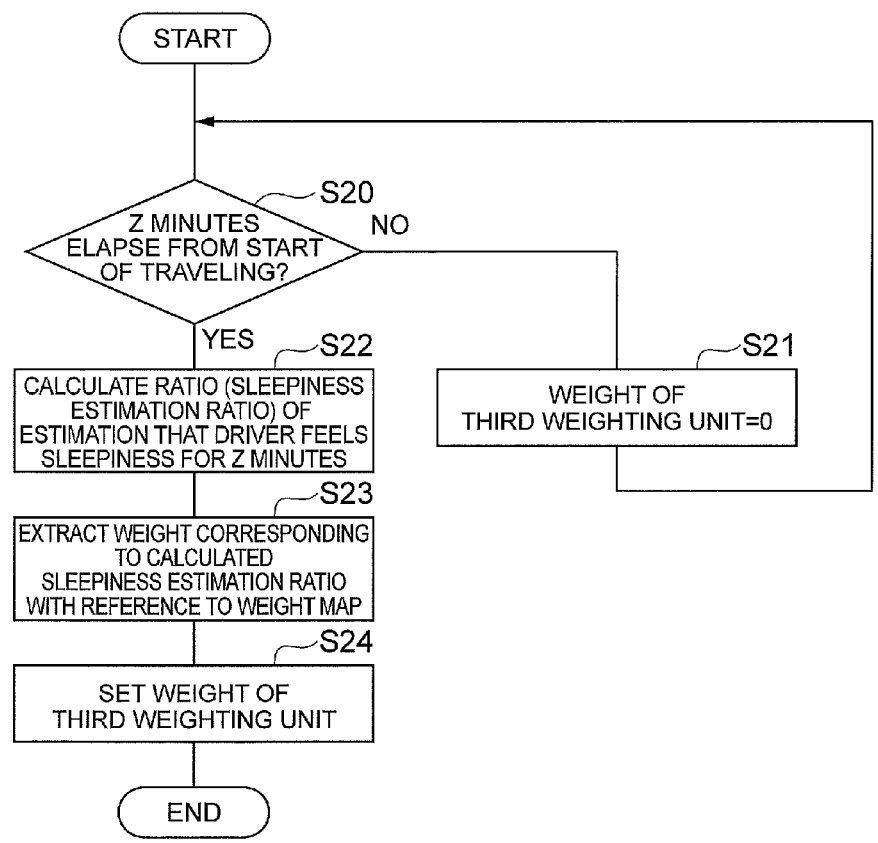
FIG. 5 is a flowchart showing the operation of a third weight setting unit.

Subsequently, the operation of the biological state determination device 1 of this embodiment will be described specifically with reference to FIGS. 2 to 5. FIG. 2 is a diagram showing a weight map in each of the first to third weight setting units 3A, 3B, and 3C. FIG. 3 is a flowchart showing the operation of the first weight setting unit 3A. FIG. 4 is a flowchart showing the operation of the second weight setting unit 3B. FIG. 5 is a flowchart showing the operation of the third weight setting unit 3C.

The first state estimation unit 2A acquires the face image of the driver from the face image sensor 10. Next, the first state estimation unit 2A extracts information, such as the frequency of blinking, the speed of blinking, the degree of opening of the eyes, and the eye-opening time, on the basis of the images of the eyes and eyelids in the face image. The first state estimation unit 2A estimates the presence/absence of sleepiness in the driver on the basis of the extracted information. The first state estimation unit 2A can estimate the presence/absence of sleepiness on the basis of the face image using a known technique. When it is estimated that the driver feels sleepiness, the first state estimation unit 2A sends an estimation value "1" to the first weighting unit 4A. When it is not estimated that the driver feels sleepiness, the first state estimation unit 2A sends an estimation value "0" to the first weighting unit 4A. The first state estimation unit 2A sends the face image to the first weight setting unit 3A.

The operation of the first weight setting unit 3A will be described with reference to FIG. 3. First, the first weight setting unit 3A detects the presence/absence of a worn article and the type of a worn article in the face image sent from the first state estimation unit 2A (S1).

Subsequently, the first weight setting unit 3A extracts a weight on the basis of the detected worn article with reference to a weight map 3a. FIG. 2(a) is an example of the weight map 3a in the first weight setting unit 3A. As shown in FIG. 2(a), the weight map 3a stores weight values in association with the types of worn articles. For example, when glasses are detected from the face image as a worn article, the first weight setting unit 3A extracts "0.5" as a weight value (S2). That is, information relating to the presence/absence of a worn article and the type of a worn article in the face image is information representing the level of possibility that the first state estimation unit 2A erroneously estimates the driver biological state.

The first weight setting unit 3A sets the extracted weight value in the first weighting unit 4A as a weight for the estimation value of the driver biological state (S3).

The first weighting unit 4A multiplies the weight value set by the first weight setting unit 3A to the estimation value acquired from the first state estimation unit 2A to calculate the value of the weighted driver biological state. The first weighting unit 4A sends the value of the weighted driver biological state to the state determination unit 5.

When an article is worn on the face of the driver, the estimation accuracy of sleepiness of the driver based on the state of the eyes or eyelids is lowered. The first weight setting unit 3A sets the weight on the basis of the presence/absence and the type of an article worn on the face of the driver, thereby improving the determination accuracy of sleepiness of the driver.

The second state estimation unit 2B acquires information relating to the relative white line position of the relative position with respect to the host vehicle from the vehicle behavior sensor 11. Next, the second state estimation unit 2B detects the degree of drifting in the traveling state of the host vehicle on the basis of, for example, change in the white line position. The second state estimation unit 2B estimates the presence/absence of sleepiness in the driver on the basis of the degree of drifting. The second state estimation unit 2B can estimate the presence/absence of sleepiness on the basis of the degree of drifting of the host vehicle using a known technique. When it is estimated that the driver feels sleepiness, the second state estimation unit 2B sends the estimation value "1" to the second weighting unit 4B. When it is not estimated that the driver feels sleepiness, the second state estimation unit 2B sends the estimation value "0" to the second weighting unit 4B. The second state estimation unit 2B sends information relating to the detection state of the white line position in the vehicle behavior sensor 11 to the second weight setting unit 3B. The information relating to the detection state of the white line position includes information on whether or not the vehicle behavior sensor 11 detects the white lines.

The second weight setting unit 3B calculates a detection target recognition rate which is the ratio of the time when the white line position is detected for Y minutes which are the time set in advance, and sets the weight in the second weighting unit 4B on the basis of the detection target recognition rate. That is, since the second state estimation unit 2B estimates the presence/absence of sleepiness of the driver on the basis of the white line position, the second state estimation unit 2B cannot estimate the state of sleepiness of the driver for a non-detection time of the white line position. Accordingly, since the weight is set in the second weighting unit 4B on the basis of the detection target recognition rate, it is possible to improve the determination accuracy of the biological state of the driver. The detection target recognition rate is information representing the level of possibility that the second state estimation unit 2B erroneously estimates the driver biological state.

The operation of the second weight setting unit 3B will be described with reference to FIG. 4. First, the second weight setting unit 3B determines whether or not Y minutes which are the time set in advance elapse from the start of traveling of the host vehicle (S10). When it is not determined that Y minutes have elapsed, since the second weighting unit 4B cannot send a high-accuracy value of the driver biological state to the state determination unit 5, the second weight setting unit 3B sets "0" in the second weighting unit 4B as a weight value (S11).

When it is determined that Y minutes have elapsed, the second weight setting unit 3B calculates the ratio (detection target recognition rate) of the time when the white line position as a detection target is detected for Y minutes on the basis of the information relating to the detection state of the white line position (S12).

Subsequently, the second weight setting unit 3B extracts a weight on the basis of the calculated detection target recognition rate with reference to a weight map 3b. FIG. 2(b) is an example of the weight map 3b in the second weight setting unit 3B. As shown in FIG. 2(b), the weight map 3b stores weight values in association with detection target recognition rates. For example, when the detection target recognition rate is 70%, the second weight setting unit 3B extracts "0.7" as a weight value (S13).

The second weight setting unit 3B sets the extracted weight value in the second weighting unit 4B as a weight for the estimation value of the driver biological state (S14).

The second weighting unit 4B multiplies the weight value set by the second weight setting unit 3B to the estimation value acquired by the second state estimation unit 2B to calculate the value of the weighted driver biological state. The second weighting unit 4B sends the value of the weighted driver biological state to the state determination unit 5.

The third state estimation unit 2C acquires information relating to the brainwave of the driver of the vehicle from the brainwave sensor 12. Next, the third state estimation unit 2C estimates the presence/absence of sleepiness in the driver on the basis of the state of the brainwave of the driver. The third state estimation unit 2C can estimate the presence/absence of sleepiness on the basis of the state of the brainwave using a known technique. When it is estimated that the driver feels sleepiness, the third state estimation unit 2C sends the estimation value "1" to the third weighting unit 4C and the third weight setting unit 3C. When it is not estimated that the driver feels sleepiness, the third state estimation unit 2C sends the estimation value "0" to the third weighting unit 4C and the third weight setting unit 3C.

Until Z minutes which are the time set in advance elapse from the start of traveling of the host vehicle, the third weight setting unit 3C calculates a sleepiness estimation ratio which is the ratio of the time when it is estimated that the driver feels sleepiness. Until a given time elapses from the start of traveling, it can be regarded as the time when the driver is less likely to feel sleepiness. Accordingly, when it is estimated that the driver feels sleepiness during this time, there is a high possibility that the estimation is erroneous estimation. That is, the sleepiness estimation ratio is information representing the level of possibility that the third state estimation unit 2C erroneously estimates the driver biological state. The third weight setting unit 3C sets the weight in the third weighting unit 4C on the basis of the sleepiness estimation ratio.

The operation of the third weight setting unit 3C will be described with reference to FIG. 5. First, the third weight setting unit 3C determines whether or not Z minutes which are the time set in advance elapse from the start of traveling of the host vehicle (S20). When it is not determined that Z minutes have elapsed, since the weight value is not determined, and the third weighting unit 4C cannot send a high-accuracy value of the driver biological state to the state determination unit 5, the third weight setting unit 3C sets "0" in the third weighting unit 4C as a weight value (S11).

When it is determined that Z minutes have elapsed, the third weight setting unit 3C calculates the sleepiness estimation ratio which is the ratio of the time when the driver feels sleepiness until Z minutes elapse on the basis of the estimation value sent from the third state estimation unit 2C. For example, the third state estimation unit 2C estimates the state of sleepiness of the driver, and when the estimation value is sent to the third weight setting unit 3C every minute, the third weight setting unit 3C calculates the sleepiness estimation ratio through calculation of Expression (1) (S12).

$$\text{sleepiness estimation ratio} = ((\text{number of times in which estimation value ``1'' is acquired for } Z \text{ minutes})/Z) \quad (1)$$

Subsequently, the third weight setting unit 3C calculates a weight on the basis of the calculated sleepiness estimation ratio with reference to a weight map 3c. FIG. 2(c) is an example of the weight map 3c in the third weight setting unit 3C. As shown in FIG. 2(c), the weight map 3c stores weight values in association with sleepiness estimation ratios. For example, when the sleepiness estimation ratio is 15%, the third weight setting unit 3C extracts "0.6" as a weight value (S23).

The third weight setting unit 3C sets the extracted weight value in the third weighting unit 4C as a weight for the estimation value of the driver biological state (S24).

The third weighting unit 4C multiplies the weight value set by the third weight setting unit 3C to the estimation value acquired from the third state estimation unit 2C to calculate the value of the weighted driver biological state. The third weighting unit 4C sends the value of the weighted driver biological state to the state determination unit 5.

The state determination unit 5 acquires the values of the weighted driver biological states from the first weighting unit 4A, the second weighting unit 4B, and the third weighting unit 4C. Subsequently, the state determination unit 5 adds or multiplies the values of the weighted driver biological states to calculate the determination value, and when the determination value is greater than the threshold value set in advance, determines that the driver feels sleepiness. The state determination unit 5 sends the determination result of the presence/absence of sleepiness of the driver to the warning unit 6.

When the state determination unit 5 determines that the driver feels sleepiness, the warning unit 6 gives a warning to the driver through at least one of auditory sensation and visual sensation. Specifically, when it is determined that the driver feels sleepiness, the warning unit 6 causes the display/report device 13 to give a warning to the driver.

The invention has been described in detail on the basis of the embodiment. However, the invention is not limited to the foregoing embodiment, and the invention may be modified in various ways without departing from the scope of the invention.

Although in this embodiment, the vehicle behavior sensor 11 detects the relative position of the white lines on the road, on which the host vehicle travels, with respect to the host vehicle, and the second state estimation unit 2B detects the degree of drifting in the traveling state of the host vehicle and estimates the presence/absence of sleepiness of the driver on the basis of change in the white line position, the invention is not limited thereto. For example, the vehicle behavior sensor 11 may detect a road-side position on the road on which the host vehicle travels. In this case, the second state estimation unit 2B may detect the degree of drifting in the traveling state of the host vehicle on the basis of change in the road-side position.

Although in this embodiment, the third state estimation unit 2C estimates the presence/absence of sleepiness in the driver on the basis of the state of the brainwave of the driver detected by the brainwave sensor 12, the invention is not limited thereto. For example, instead of the brainwave sensor 12, a heartbeat sensor may be connected to the third state estimation unit 2C. In this case, the third state estimation unit 2C may estimate the presence/absence of sleepiness in the driver on the basis of the state of the heartbeat of the driver.

In this embodiment, until Z minutes which are the time set in advance elapse, the third weight setting unit 3C calculates the sleepiness estimation ratio which is the ratio of the time when the third state estimation unit 2C estimates that the driver feels sleepiness, and sets the weight in the third weighting unit 4C on the basis of the calculated sleepiness estimation ratio. The method of setting a weight using the third weight setting unit 3C may be applied to weighting to the first weighting unit 4A using the first weight setting unit 3A and weighting to the second weighting unit 4B using the second weight setting unit 3B. That is, the first weight setting unit 3A may calculate the ratio of the time when it is estimated that the driver feels sleepiness for Z minutes using the first state estimation unit 2A, and may set the weight in the first weighting unit 4A on the basis of the calculated ratio. The second weight setting unit 3B may calculate the ratio of the time when the driver feels sleepiness for Z minutes using the second state estimation unit 2B, and may set the weight in the second weighting unit 4B on the basis of the calculated ratio.

In this embodiment, until Y minutes which are the time set in advance elapse from the start of traveling, the second weight setting unit 3B calculates the detection target recognition rate which is the ratio of the time when the white line position is detected, and sets the weight in the second weighting unit 4B on the basis of the detection target recognition rate, the method of setting a weight using the second weight setting unit 3B may be applied to weighting to the first weighting unit 4A using the first weight setting unit 3A and weighting to the first weighting unit 4C using the third weight setting unit 3C. That is, the first weight setting unit 3A may calculate the ratio of the time when the face image sensor 10 and the first state estimation unit 2A detect the face image of the driver for Y minutes as the detection target recognition rate, and may set the weight in the first weighting unit 4A on the basis of the calculated detection target recognition rate. The third weight setting unit 3C may calculate the ratio of the time when the brainwave sensor 12 and the third state estimation unit 2C detect the brainwave of the driver for Y minutes as the detection target recognition rate, and may set the weight in the third weighting unit 4C on the basis of the calculated detection target recognition rate.

As described above, according to the biological state determination device 1 of this embodiment, since a weight is set for each driver biological state on the basis of information representing the level of possibility that the driver biological state is erroneously estimated, and each driver biological state is weighted with the set weight, the weighted driver biological state becomes information in which the possibility of erroneous estimation has been taken into consideration. Since the presence/absence of sleepiness of the driver is determined on the basis of a plurality of weighted driver biological states, it is possible to improve the determination accuracy of sleepiness of the driver of the vehicle.

INDUSTRIAL APPLICABILITY

According to the invention, it is possible to determine the biological state of the driver of the vehicle with high accuracy.

REFERENCE SIGNS LIST

1: biological state determination device, 2: state estimation unit, 2A: first state estimation unit, 2B: second state estimation unit, 2C: third state estimation unit, 3: weight setting unit, 3A: first weight setting unit, 3B: second weight setting unit, 3C: third weight setting unit, 4: weighting unit, 4A: first weighting unit, 4B: second weighting unit, 4C: third weighting unit, 5: state determination unit, 6: warning unit, 10: face image sensor, 11: vehicle behavior sensor, 12: brainwave sensor, 13: display/report device.

The invention claimed is:

1. A biological state determination device which is mounted in a vehicle and determines a biological state of a driver, the biological state determination device comprising: a plurality of state estimation units configured to estimate a driver biological state, which is the biological state of the driver, on the basis of information representing the biological state of the driver; a weight setting unit configured to set a weight for each driver biological state on the basis of information representing the level of possibility of erroneously estimating the driver biological state obtained on the basis of the information representing the biological state of the driver; a weighting unit configured to weight a plurality of driver biological states using the weight set by the weight setting unit; and a state determination unit configured to determine the presence/absence of abnormality in the biological state of the driver on the basis of a plurality of driver biological states weighted by the weighting unit, wherein the state estimation unit estimates the presence/absence of sleepiness in the driver as the biological state of the driver, and the state determination unit determines, as an abnormality, a state where the driver feels sleepiness, and wherein, until a predetermined time set in advance elapses from the start of driving, the weight setting unit sets the weight on the basis of the ratio of the time for which the state estimation unit estimates that the driver feels sleepiness with respect to the predetermined time.

2. The biological state determination device according to claim 1, further comprising:
a warning unit configured to give a warning to the driver through at least one of auditory sensation and visual sensation when the state determination unit determines that there is an abnormality in the biological state of the driver.

3. The biological state determination device according to claim 1,
wherein the weight setting unit sets the weight on the basis of the ratio of a non-detection time of information representing the biological state of the driver in the state estimation unit with respect to a given time set in advance.

4. The biological state determination device according to claim 1,
wherein the state estimation unit estimates the driver biological state on the basis of the state of the eyes or eyelids of the driver, and
the weight setting unit sets the weight on the basis of the presence/absence and the type of an article worn on the face of the driver.

* * * * *